US010700906B2

(12) United States Patent
Montreuil et al.

(10) Patent No.: US 10,700,906 B2
(45) Date of Patent: *Jun. 30, 2020

(54) RESOURCE UNIT (RU) ALLOCATION FOR A COMMUNICATION CHANNEL BETWEEN WIRELESS COMMUNICATION DEVICES

(71) Applicant: Avago Technologies International Sales Pte. Limited, Singapore (SG)

(72) Inventors: Leo Montreuil, Atlanta, GA (US); Ron Porat, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,428

(22) Filed: Nov. 8, 2018

(65) Prior Publication Data
US 2019/0081837 A1    Mar. 14, 2019

Related U.S. Application Data

(63) Continuation of application No. 15/333,843, filed on Oct. 25, 2016, now Pat. No. 10,153,932.

(60) Provisional application No. 62/250,412, filed on Nov. 3, 2015, provisional application No. 62/277,154, filed on Jan. 11, 2016, provisional application No. 62/410,719, filed on Oct. 20, 2016.

(51) Int. Cl.
*H04W 4/00* (2018.01)
*H04L 27/26* (2006.01)
*H04L 5/00* (2006.01)

(52) U.S. Cl.
CPC ........ *H04L 27/2613* (2013.01); *H04L 5/0094* (2013.01); *H04L 5/0007* (2013.01)

(58) Field of Classification Search
CPC .. H04L 27/2613; H04L 5/0094; H04L 5/0007
See application file for complete search history.

(56) References Cited

U.S. PATENT DOCUMENTS

2010/0118991 A1*  5/2010  Lee .................... H04L 5/003
                                                      375/260
2011/0013543 A1   1/2011  Lim
(Continued)

*Primary Examiner* — Abdelnabi O Musa
(74) *Attorney, Agent, or Firm* — Foley & Lardner LLP

(57) ABSTRACT

A wireless communication device (alternatively, device, WDEV, etc.) includes at least one processing circuitry configured to support communications with other WDEV(s) and to generate and process signals for such communications. In some examples, the device includes a communication interface and a processing circuitry, among other possible circuitries, components, elements, etc. to support communications with other WDEV(s) and to generate and process signals for such communications. A WDEV generates an orthogonal frequency division multiple access (OFDMA) frame that includes a preamble that specifies allocation and/or non-allocation of at least one resource unit (RU) for a communication channel and transmits the OFDMA frame to at least one other wireless communication device to be processed by the at least one other wireless communication device to determine the allocation of the at least one RU for the communication channel or the non-allocation of the at least one RU for the communication channel.

20 Claims, 10 Drawing Sheets

(56) References Cited

U.S. PATENT DOCUMENTS

| | | | |
|---|---|---|---|
| 2015/0327217 A1* | 11/2015 | Aboul-Magd | ...... H04W 72/121 |
| | | | 370/329 |
| 2016/0330715 A1* | 11/2016 | Chen | ................... H04L 27/2602 |
| 2017/0019891 A1 | 1/2017 | Rong | |
| 2017/0367078 A1 | 12/2017 | Chun | |

* cited by examiner

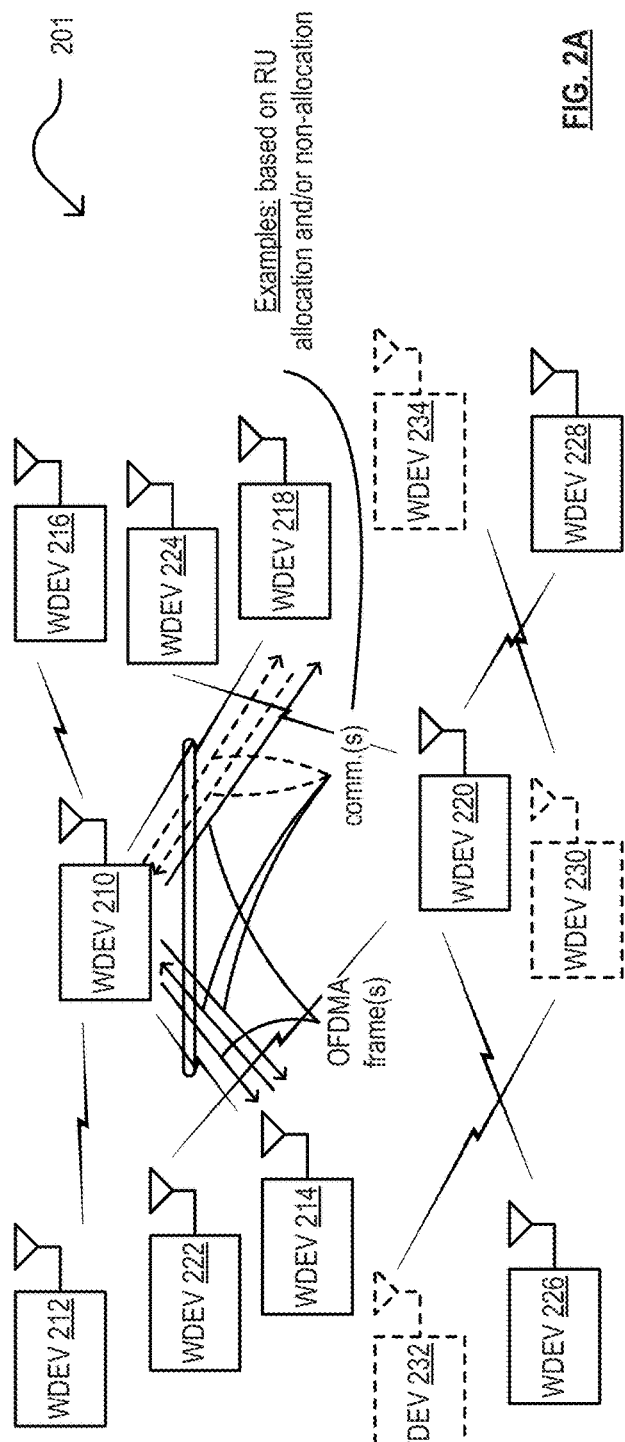
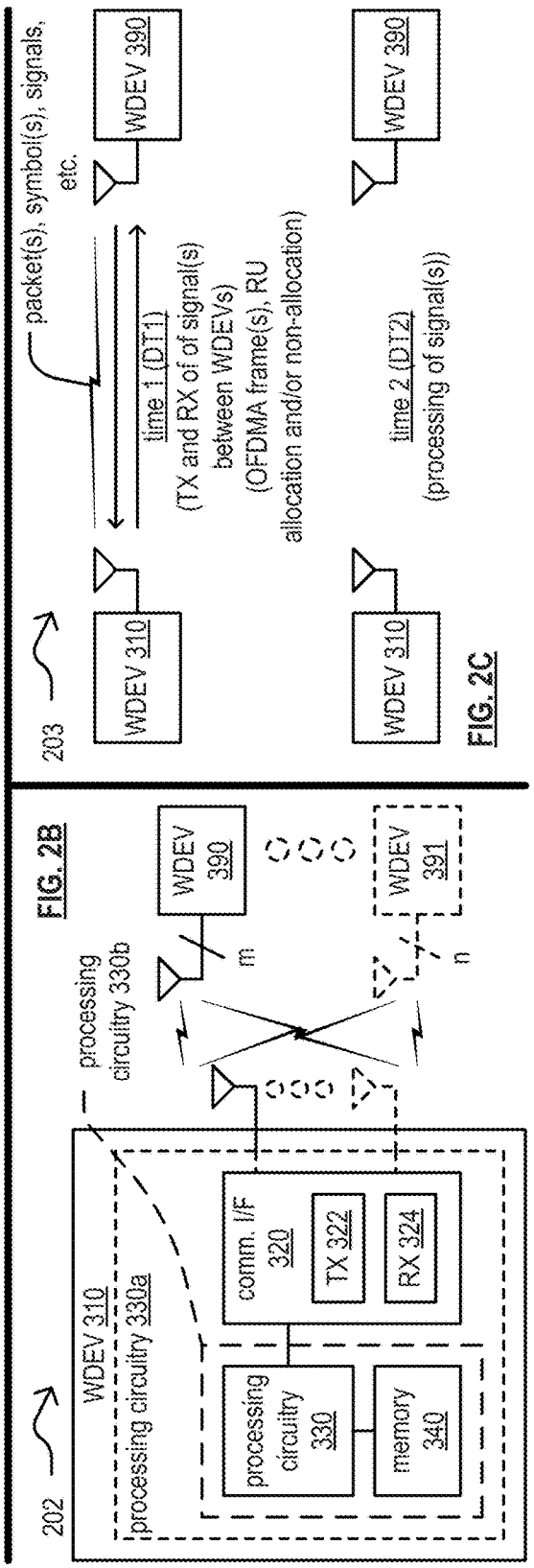

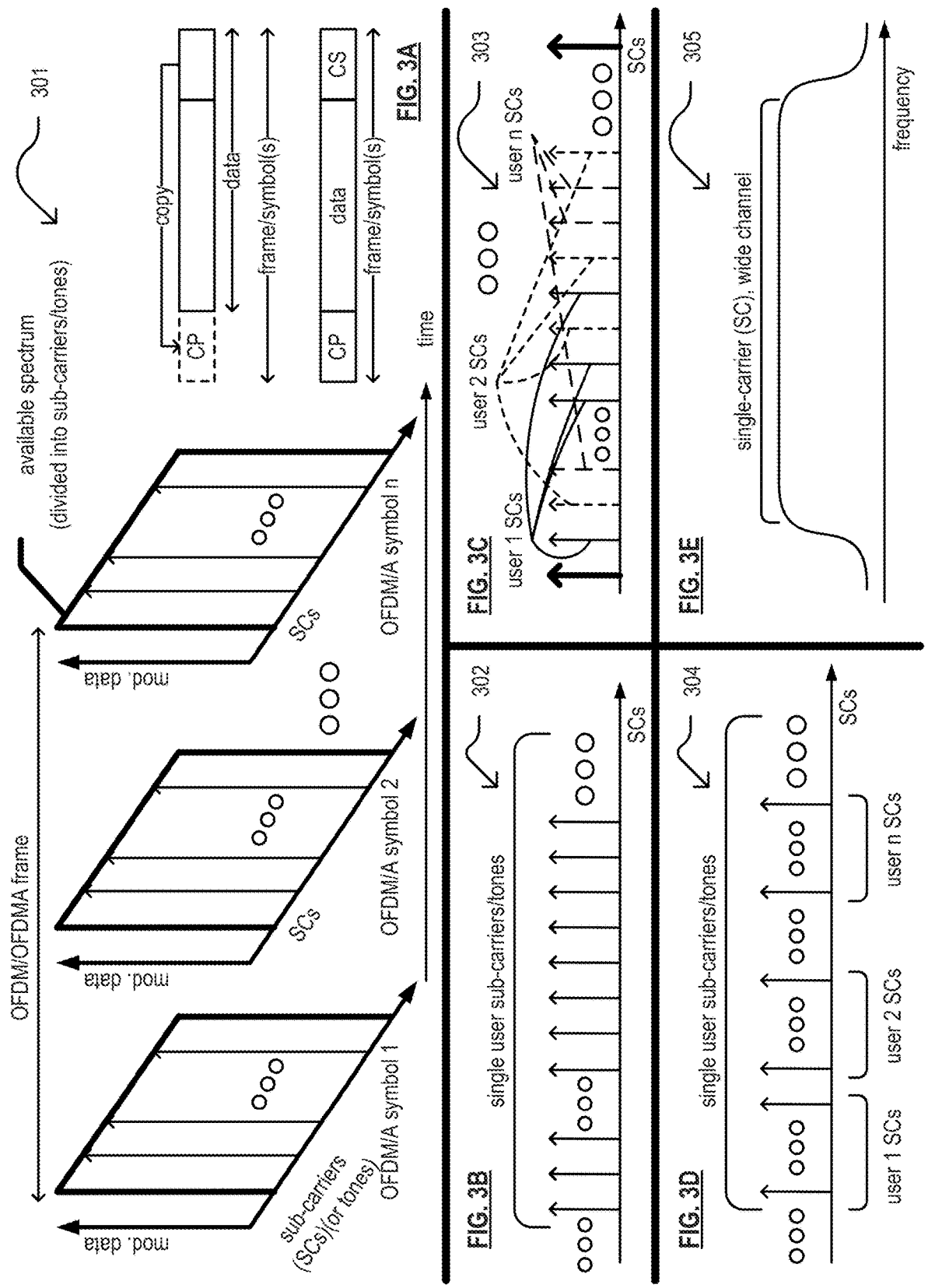

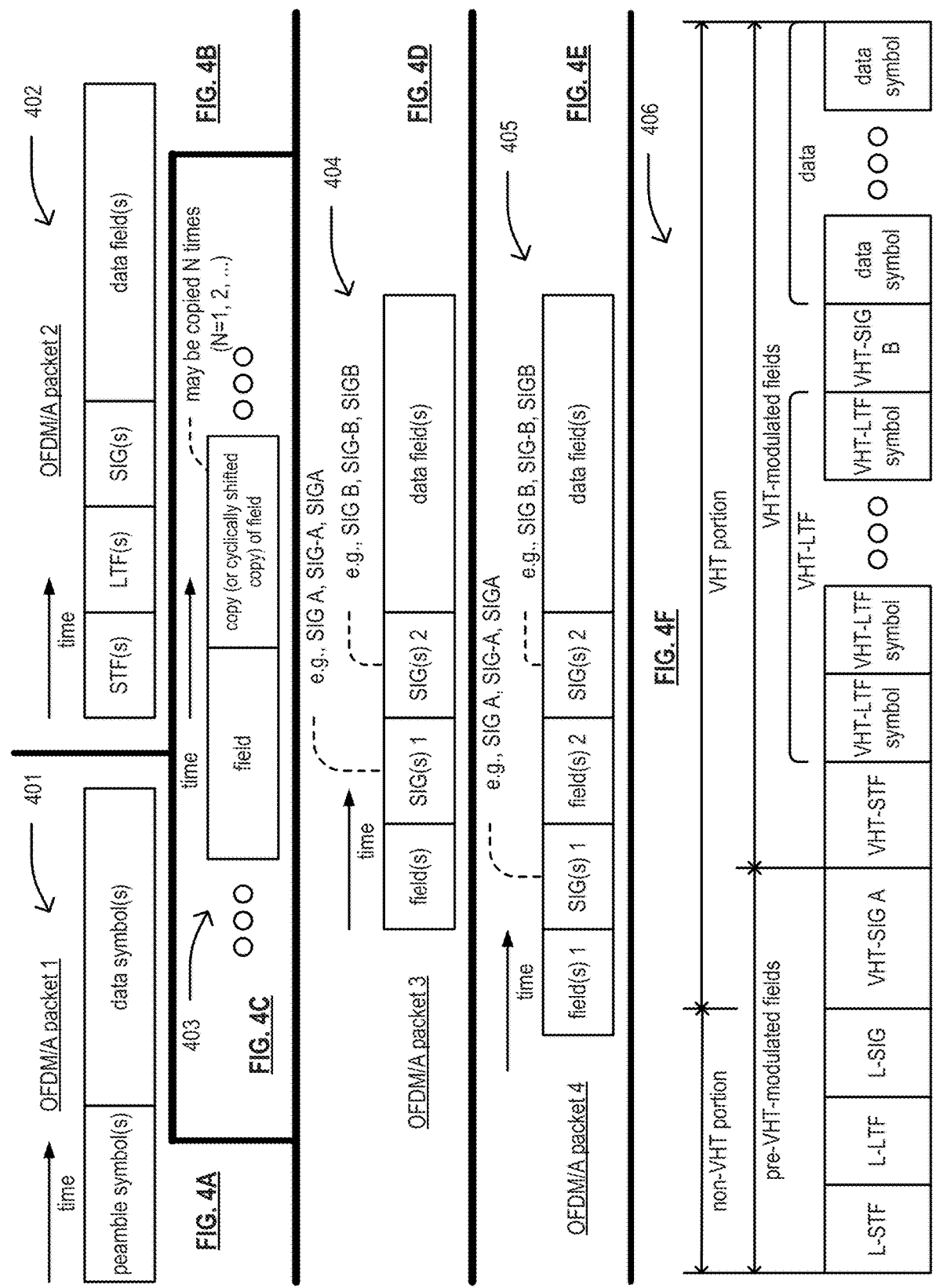

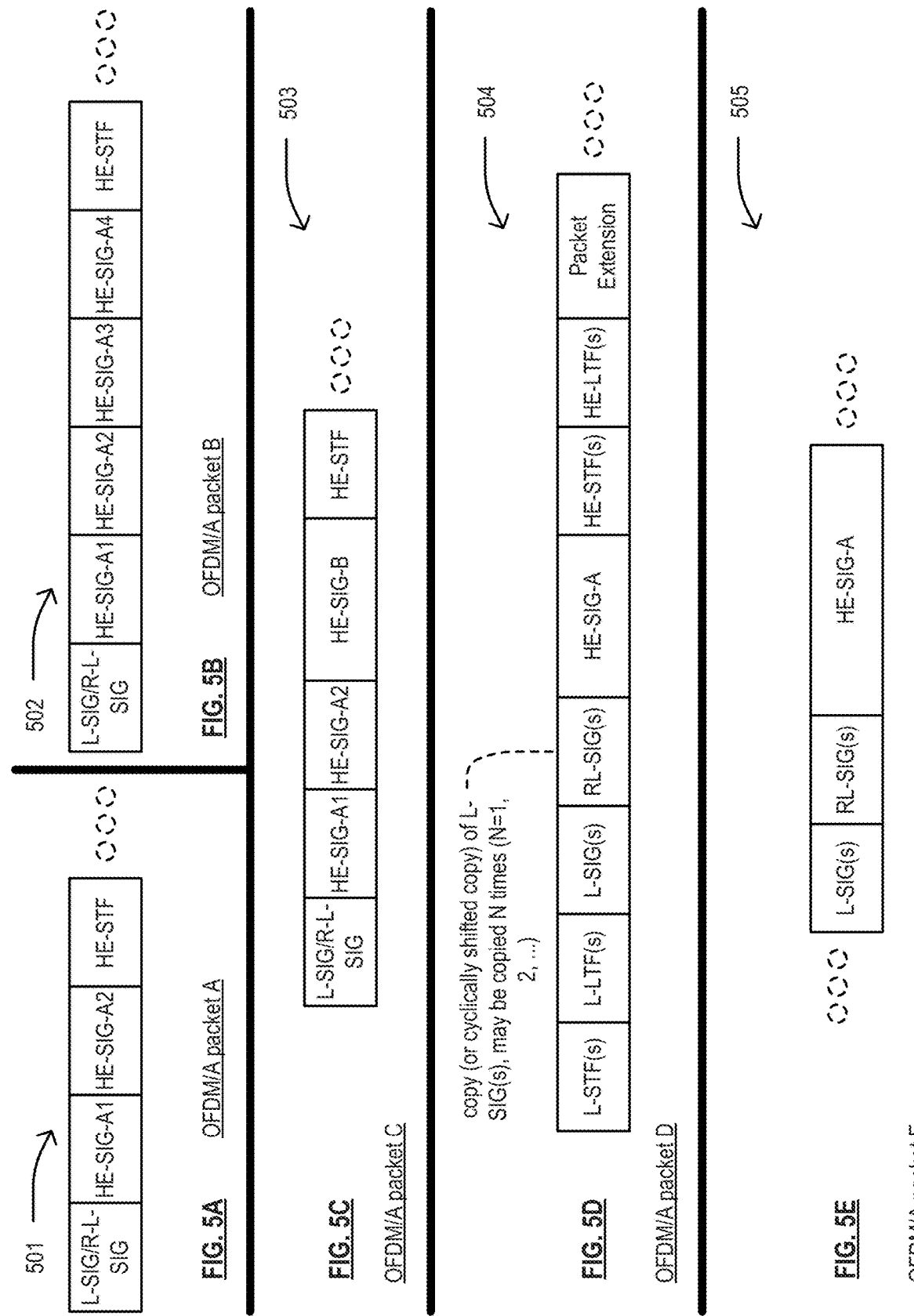

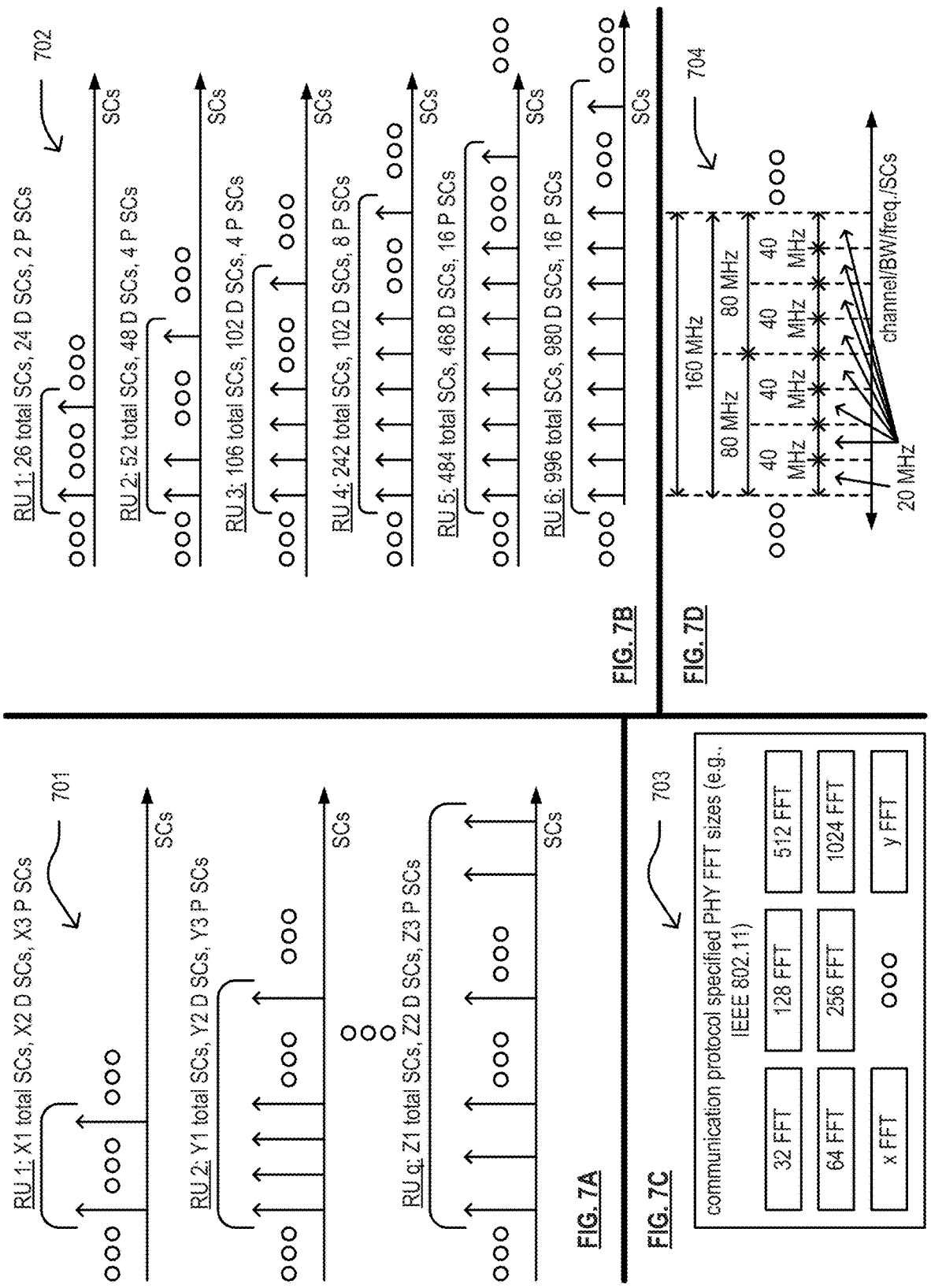

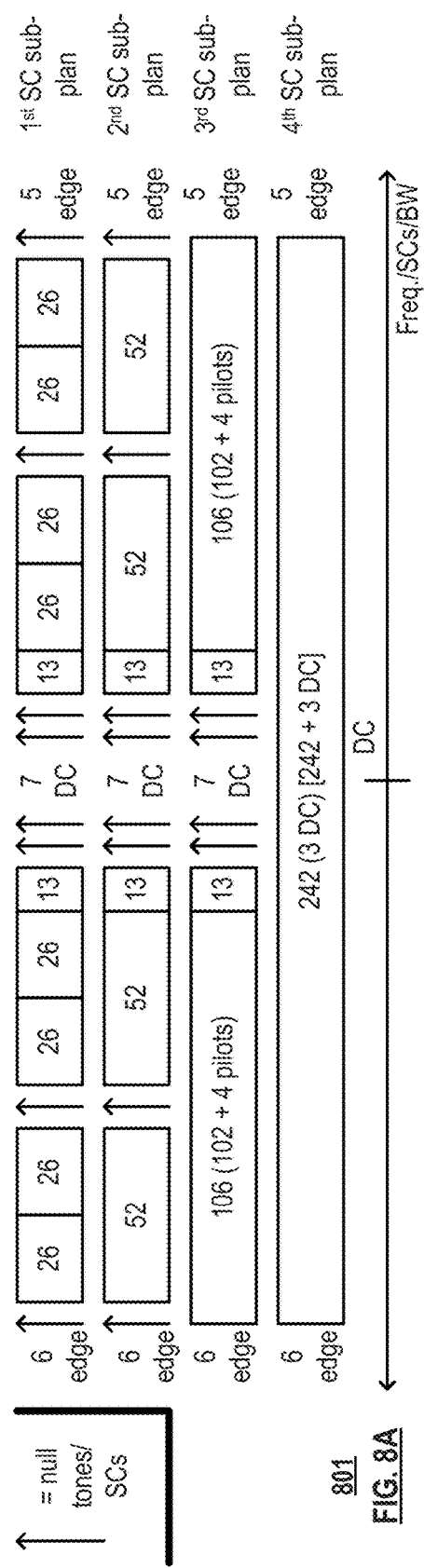
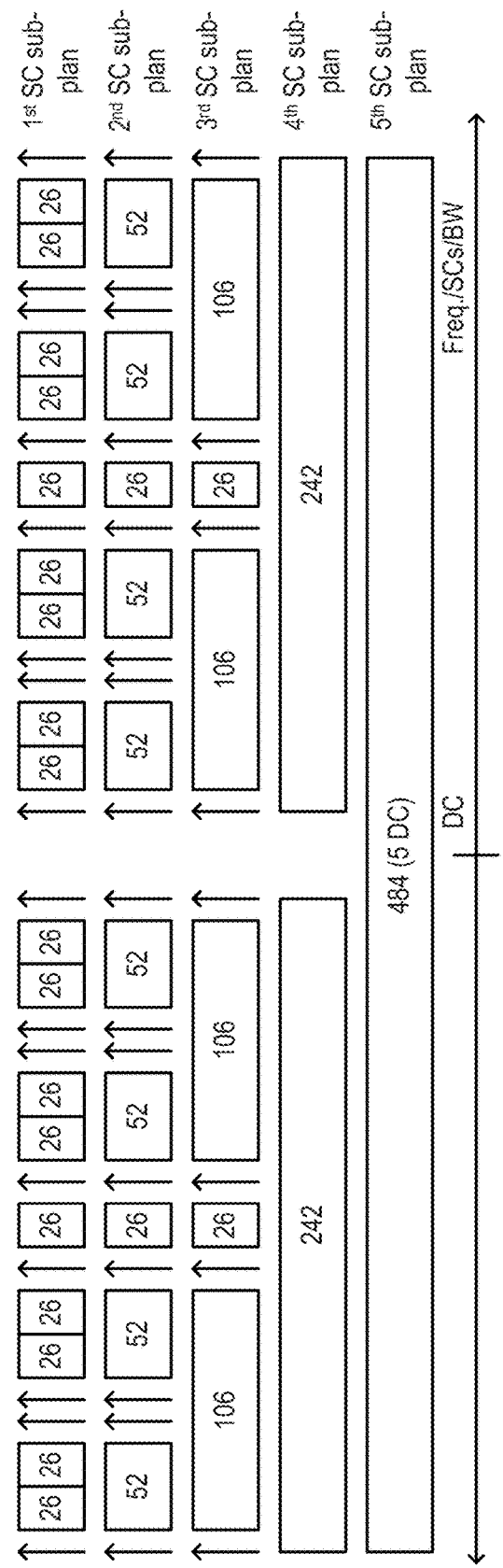

901

902

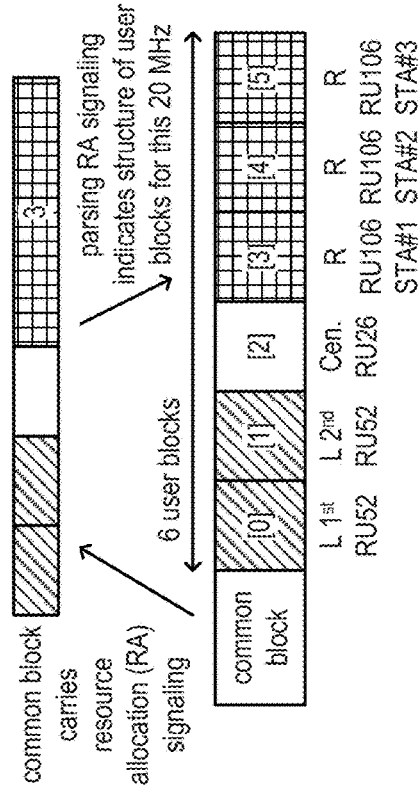
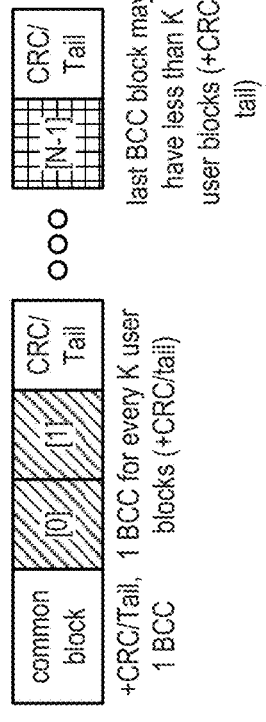

RESOURCE UNIT (RU) ALLOCATION FOR A COMMUNICATION CHANNEL BETWEEN WIRELESS COMMUNICATION DEVICES

CROSS REFERENCE TO RELATED PATENTS/PATENT APPLICATIONS

The present U.S. Utility Patent Application claims priority pursuant to 35 U.S.C. § 120 as a continuation of U.S. Utility application Ser. No. 15/333,843, entitled "Resource unit (RU) allocation within wireless communications," filed Oct. 25, 2016, pending, which claims priority pursuant to 35 U.S.C. § 119(e) to U.S. Provisional Application No. 62/250,412, entitled "Resource unit (RU) allocation within wireless communications," filed Nov. 3, 2015; U.S. Provisional Application No. 62/277,154, entitled "Resource unit (RU) allocation within wireless communications," filed Jan. 11, 2016; and U.S. Provisional Application No. 62/410,719, entitled "Resource unit (RU) allocation within wireless communications," filed Oct. 20, 2016, all of which are hereby incorporated herein by reference in their entirety and made part of the present U.S. Utility Patent Application for all purposes.

BACKGROUND

Technical Field

The present disclosure relates generally to communication systems; and, more particularly, to resource unit (RU) allocation within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennas and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennas to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

The prior art employs various means to perform signaling and communication between wireless communication devices that are highly consumptive of the communication medium and also can include significant overhead and poor efficiency in terms of information conveyed. There continues to exist a need in the art for improved and more efficient means for communicating information between wireless communication devices.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of an OFDM/A packet.

FIG. 4B is a diagram illustrating another example of an OFDM/A packet of a second type.

FIG. 4C is a diagram illustrating an example of at least one portion of an OFDM/A packet of another type.

FIG. 4D is a diagram illustrating another example of an OFDM/A packet of a third type.

FIG. 4E is a diagram illustrating another example of an OFDM/A packet of a fourth type.

FIG. 4F is a diagram illustrating another example of an OFDM/A packet.

FIG. 5A is a diagram illustrating another example of an OFDM/A packet.

FIG. 5B is a diagram illustrating another example of an OFDM/A packet.

FIG. 5C is a diagram illustrating another example of an OFDM/A packet.

FIG. 5D is a diagram illustrating another example of an OFDM/A packet.

FIG. 5E is a diagram illustrating another example of an OFDM/A packet.

FIG. 7A is a diagram illustrating another example of various types of different RUs.

FIG. 7B is a diagram illustrating another example of various types of different RUs.

FIG. 7C is a diagram illustrating an example of various types of communication protocol specified physical layer (PHY) fast Fourier transform (FFT) sizes.

FIG. 7D is a diagram illustrating an example of different channel bandwidths and relationship there between.

FIG. 8A is a diagram illustrating an example of a tone/sub-carrier plan.

FIG. 8B is a diagram illustrating another example of a tone/sub-carrier plan.

FIG. 10A is a diagram illustrating another example of at least a portion of an OFDMA frame.

FIG. 10B is a diagram illustrating another example of at least a portion of an OFDMA frame.

FIG. 10C is a diagram illustrating another example of at least a portion of an OFDMA frame.

FIG. 10D is a diagram illustrating an embodiment of a method for execution by one or more wireless communication devices.

FIG. 10E is a diagram illustrating another embodiment of a method for execution by one or more wireless communication devices.

DETAILED DESCRIPTION

Figure 1:
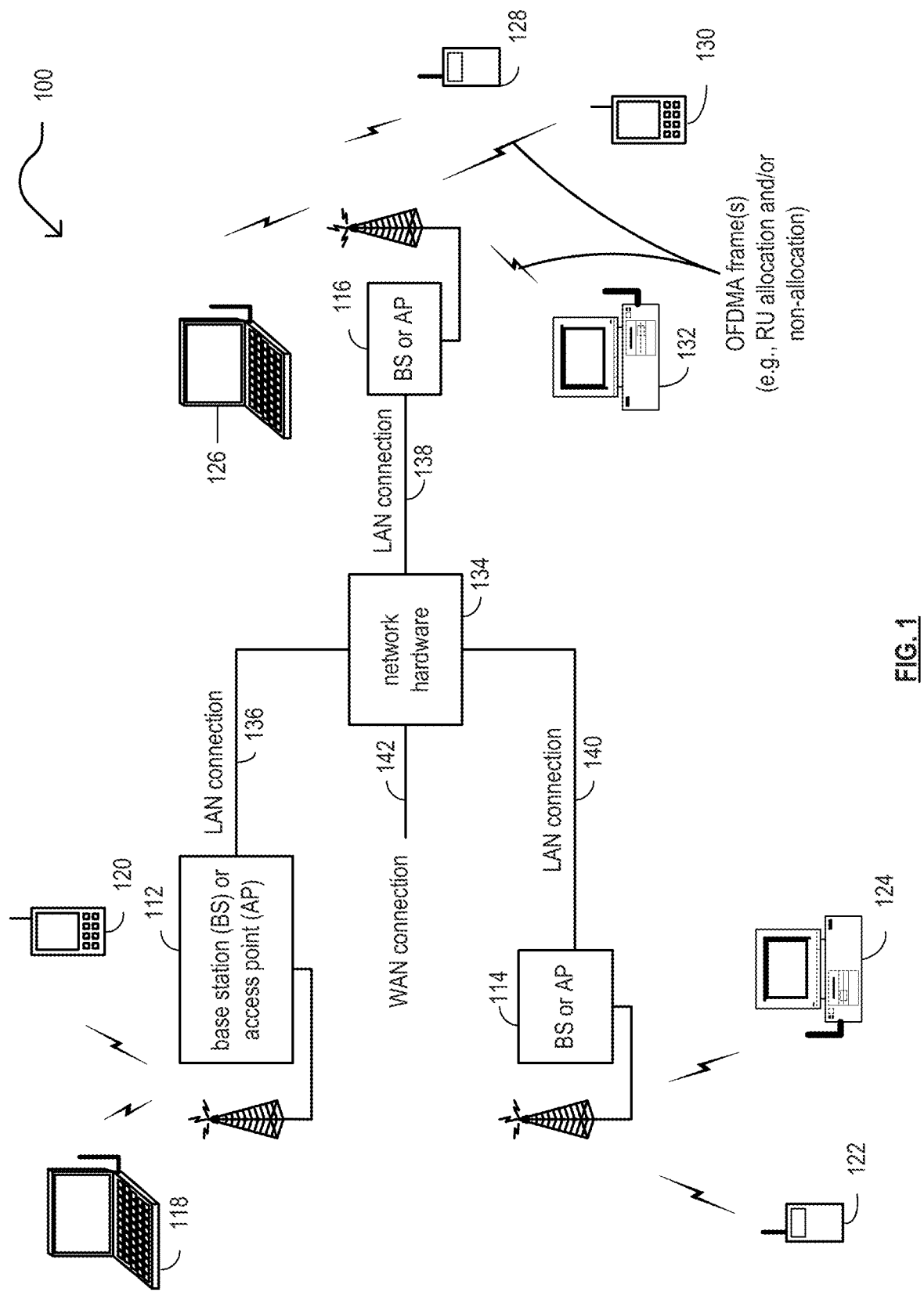
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116 or consider BS or AP 116 as a specific example) generates an orthogonal frequency division multiple access (OFDMA) frame that includes a preamble that specifies allocation of at least one resource unit (RU) for a communication channel or non-allocation of the at least one RU for the communication channel. In some examples, when the preamble specifies the allocation of the at least one RU for the communication channel, a multi-bit index of the preamble specifies at least one of a size or a location of the at least one RU allocated for the communication channel. In other examples, when the preamble specifies the non-allocation of the at least one RU for the communication channel, the multi-bit index of the preamble specifies the at least one of the size or the location of the at least one RU that is not allocated for the communication channel. The wireless communication device then transmit (e.g., via the communication channel) the OFDMA frame to at least one other wireless communication device to be processed by the at least one other wireless communication device to determine the allocation of the at least one RU for the communication channel or the non-allocation of the at least one RU for the communication channel.

Note that in other examples, the wireless communication device generates a preamble that specifies both the non-allocation of a first at least one RU for the communication channel and also allocation of a second at least one RU for the communication channel. Another wireless communication device (e.g., another one of the WDEVs 118-132 and BSs or APs 112-116 or consider WDEV 130 or WDEV 132 as a specific example) receives the OFDMA frame and process the preamble thereof to determine allocation and/or non-allocation of RU(s) specified therein. Subsequently, such wireless communication devices may support communications between each other based on any such allocation of RU(s) specified therein.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of implementation and operation, WDEV 210 generates an orthogonal frequency division multiple access (OFDMA) frame that includes a preamble that specifies allocation of at least one resource unit (RU) for a communication channel, non-allocation of a first RU for the communication channel, or non-allocation of a second RU for the communication channel. In some examples, when the preamble specifies the allocation of the at least one RU for the communication channel, a multi-bit index of the preamble is set to a first value to specify at least one of a size or a location of the at least one RU allocated for the communication channel. In other examples, when the preamble specifies the non-allocation of the first RU for the communication channel, the multi-bit index of the preamble is set to a second value to specify the at least one of the size or the location of the first RU that is not allocated for the communication channel. In even other examples, when the preamble specifies the non-allocation of the second RU for the communication channel, the multi-bit index of the preamble is set to a third value to specify at least one of another size or another location of the second RU that is not allocated for the communication channel. WDEV 210 then transmits, via the communication channel, the OFDMA frame to at least one other wireless communication device (e.g., WDEV 214 and/or WDEV 218) to be processed by the at least one other wireless communication device (e.g., WDEV 214 and/or WDEV 218) to determine the allocation of the at least one RU for the communication channel, the non-allocation of the first RU for the communication channel, or the non-allocation of the second RU for the communication channel.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennas, and WDEV 391 may include n antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, one processing circuitry 330b may be implemented to include the processing circuitry 330 and the memory 340 yet the communication interface 320 is a separate circuitry.

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. In even other examples, the device 310 includes processing circuitry 330b configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. At or during a first time (e.g., time 1 (ΔT1)), the WDEV 310 transmits signal(s) to WDEV 390, and/or the WDEV 390 transmits other signal(s) to WDEV 310. At or during a second time (e.g., time 2 (ΔT2)), the WDEV 310 processes signal(s) received from WDEV 390, and/or the WDEV 390 processes signal(s) received from WDEV 310.

In an example of operation and implementation, WDEV 310 generates an orthogonal frequency division multiple access (OFDMA) frame that includes a preamble that specifies allocation of at least one resource unit (RU) for a communication channel or non-allocation of the at least one RU for the communication channel. In some examples, when the preamble specifies the allocation of the at least one RU for the communication channel, a multi-bit index of the preamble specifies at least one of a size or a location of the at least one RU allocated for the communication channel. In other examples, when the preamble specifies the non-allocation of the at least one RU for the communication channel, the multi-bit index of the preamble specifies the at least one of the size or the location of the at least one RU that is not allocated for the communication channel. The WDEV 310 then transmits, via the communication channel, the OFDMA frame to WDEV 390 to be processed by WDEV 390 to determine the allocation of the at least one RU for the communication channel or the non-allocation of the at least one RU for the communication channel.

Then, the WDEV 390 receives and processes the received OFDMA frame and processed the OFDMA frame including the preamble therein to determine any allocation and/or non-allocation of RU(s) within a communication channel. Then, the WDEV 310 and the WDEV 390 can operate to support communications with each other based on any allocation of RU(s) within the communication channel.

In some examples, the WDEV 310 generates, when the preamble specifies the allocation of the at least one RU for the communication channel, the OFDMA frame to include at least one wireless station (STA) identifier (ID) for which the at least one RU is allocated. In other examples, the WDEV 310 generates, when the preamble specifies the non-allocation of the at least one RU for the communication channel, the OFDMA frame to include the multi-bit index of the preamble that specifies the at least one of the size or the location of the at least one RU that is not allocated for the communication channel and also specifies at least one of another size or another location of at least one other RU allocated for the communication channel and also generates the OFDMA frame to include at least one wireless station (STA) identifier (ID) for which the at least one other RU is allocated. Also, in even other examples, the WDEV 310 generate, when the preamble specifies allocation of at least two RUs for the communication channel, the OFDMA frame to include a first wireless station (STA) identifier (ID) for which a first RU of the at least two RUs is allocated followed by a second STA ID for which a second RU of the at least two RUs is allocated.

In some examples, the WDEV 310 generate another OFDMA frame that includes another preamble that specifies non-allocation of at least one other RU for the communication channel, wherein another multi-bit index of the another preamble specifies at least one of another size or another location of the at least one other RU that is not allocated for the communication channel. Then, the WDEV 310 transmits, via the communication channel, the another OFDMA frame to at least one of the at least one other wireless communication device or at least one additional wireless communication device to be processed by the at least one of the at least one other wireless communication device or the at least one additional wireless communication device to determine the non-allocation of the at least one other RU for the communication channel.

In some examples, note that a communication interface within the WDEV 310 (e.g., such as communication interface 320 as shown in FIG. 2B) may be implemented to support communications within a satellite communication system, a wireless communication system, a wired communication system, a fiber-optic communication system, and/or a mobile communication system.

In another example of implementation and operation, the WDEV 310 includes both a processing circuitry (e.g., such as processing circuitry 330, 330a, or 330b as shown in FIG. 2B) to perform many of the operations described above and also includes a communication interface (e.g., such as communication interface 320 as shown in FIG. 2B), coupled to the processing circuitry, that is configured to support communications within a satellite communication system, a wireless communication system, a wired communication system, a fiber-optic communication system, and/or a mobile communication system. The processing circuitry is configured to transmit the first OFDMA packet and/or the second OFDMA packet to WDEV 390 and/or WDEV 391 via the communication interface.

Also, in some examples, note that RUs of 26 and 52 tones are implemented using a single stream (e.g., one user per RU). RUs of 106 tones or greater can have up to 8 different streams. In certain examples, a RU allocation table may be used to specify all of the possible RUs such that allocation is made fully for 100% of the RU allocations. However, given that not every wireless communication device (e.g., network coordinator, access point (AP), etc.) will have a certain number of antennas (e.g., 8 antennas) and that performance of some RUs may be degraded, this disclosure presents various embodiment and examples in which certain cases (e.g., such as an example including 4 streams per 106 tones RU and the 26 tones RU straddling DC) where signaling is performed ahead for non-allocation and/or partial allocation of RUs in the table. Such cases include non-allocation of at least one other RU for the communication channel. In some examples, such cases operate by not using the full 100% of the RUs (e.g., non-allocation of at least one other RU for the communication channel). As also described elsewhere herein, when non-allocation of at least one other RU for the communication channel is specified, then a wireless communication device can operate by skipping sending the STA ID for at least one non-allocated RU (e.g., this reduces the preamble overhead and saves those STA ID related bits from being sent over the communication medium).

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, as shown in right hand side of FIG. 3A, a cyclic prefix (CP) and/or cyclic suffix (CS) (e.g., shown in right hand side of FIG. 3A, which may be a copy of the CP) may also be employed within the guard interval to allow switching time (e.g., such as when jumping to a new communication channel or sub-channel) and to help maintain orthogonality of the OFDM and/or OFDMA symbols. In some examples, a certain amount of information (e.g., data bits) at the end portion of the data portion is/are copied and placed at the beginning of the data to form the frame/symbol(s). In a specific example, consider that the data includes data bits $x_0, x_1, \ldots, x_{N-Ncp}, \ldots, x_{N-1}$, where the $x_{N-Ncp}$ bit is the first bit of the end portion of the data portion that is to be copied, then the bits $x_{N-Ncp}, \ldots, x_{N-1}$, are copied and placed at the beginning of the frame/symbol(s). Note that such end portion of the data portion is/are copied and placed at the beginning of the data to form the frame/symbol(s) may also be shifted, cyclically shifted, and/or copied more than once, etc. if desired in certain embodiments. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a and/or processing circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

FIG. 4A is a diagram illustrating an example 401 of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc.

among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of an OFDM/A packet of a third type. In this example 404, the OFDM/A packet includes one or more fields followed by one of more first signal fields (SIG(s) 1) followed by one of more second signal fields (SIG(s) 2) followed by and one or more data field.

FIG. 4E is a diagram illustrating another example 405 of an OFDM/A packet of a fourth type. In this example 405, the OFDM/A packet includes one or more first fields followed by one of more first signal fields (SIG(s) 1) followed by one or more second fields followed by one of more second signal fields (SIG(s) 2) followed by and one or more data field.

FIG. 4F is a diagram illustrating another example 406 of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-AL e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-AL e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-AL e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc.

communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc. communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 7D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

Figure 6A:
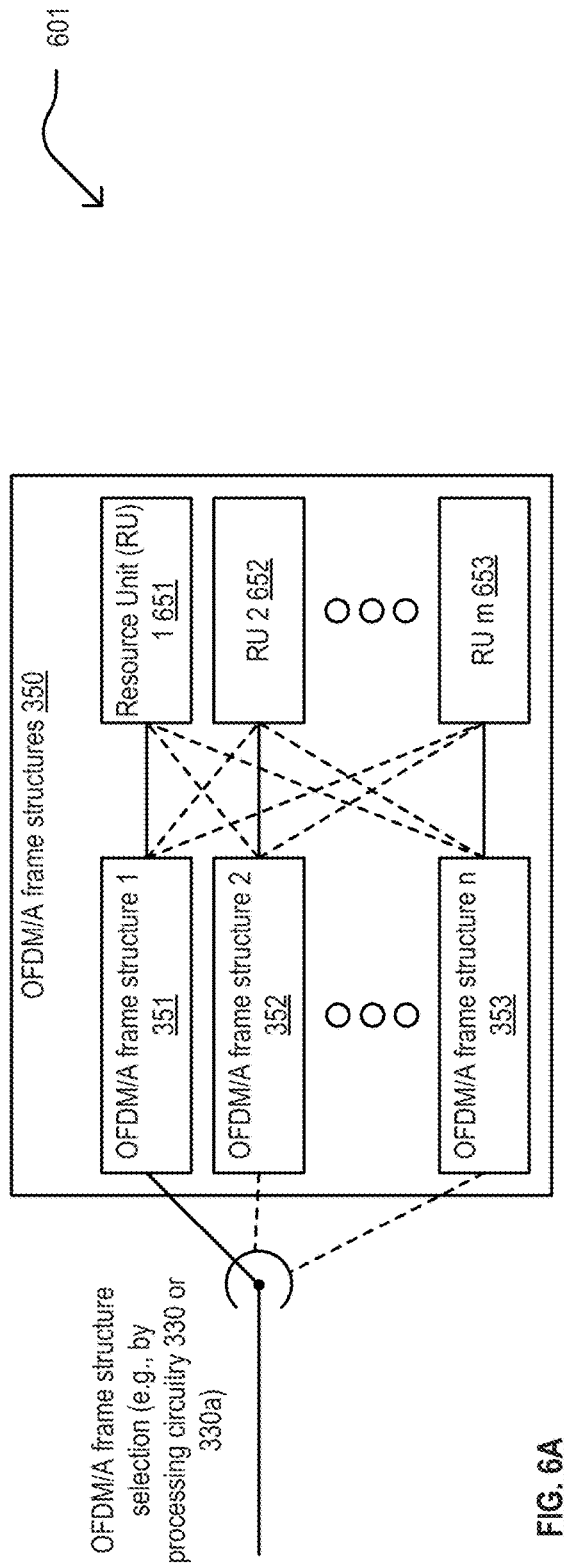
FIG. 6A is a diagram illustrating an example of selection among different OFDM/A frame structures for use in communications between wireless communication devices and specifically showing OFDM/A frame structures corresponding to one or more resource units (RUs).

FIG. 6A is a diagram illustrating an example 601 of selection among different OFDM/A frame structures for use in communications between wireless communication devices and specifically showing OFDM/A frame structures 350 corresponding to one or more resource units (RUs). This diagram may be viewed as having some similarities to allocation of sub-carriers to different users as shown in FIG. 4D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 651. In another example, OFDM/A frame structure 1 351 is composed of at least one RU 1 651 and at least one RU 2 652. In another example, OFDM/A frame structure 1 351 is composed of at least one RU 1 651, at least one RU 2 652, and at least one RU m 653. Similarly, the OFDM/A frame structure 2 352 up through OFDM/A frame structure n 353 may be composed of any combinations of the various RUs (e.g., including any one or more RU selected from the RU 1 651 through RU m 653).

Figure 6B:
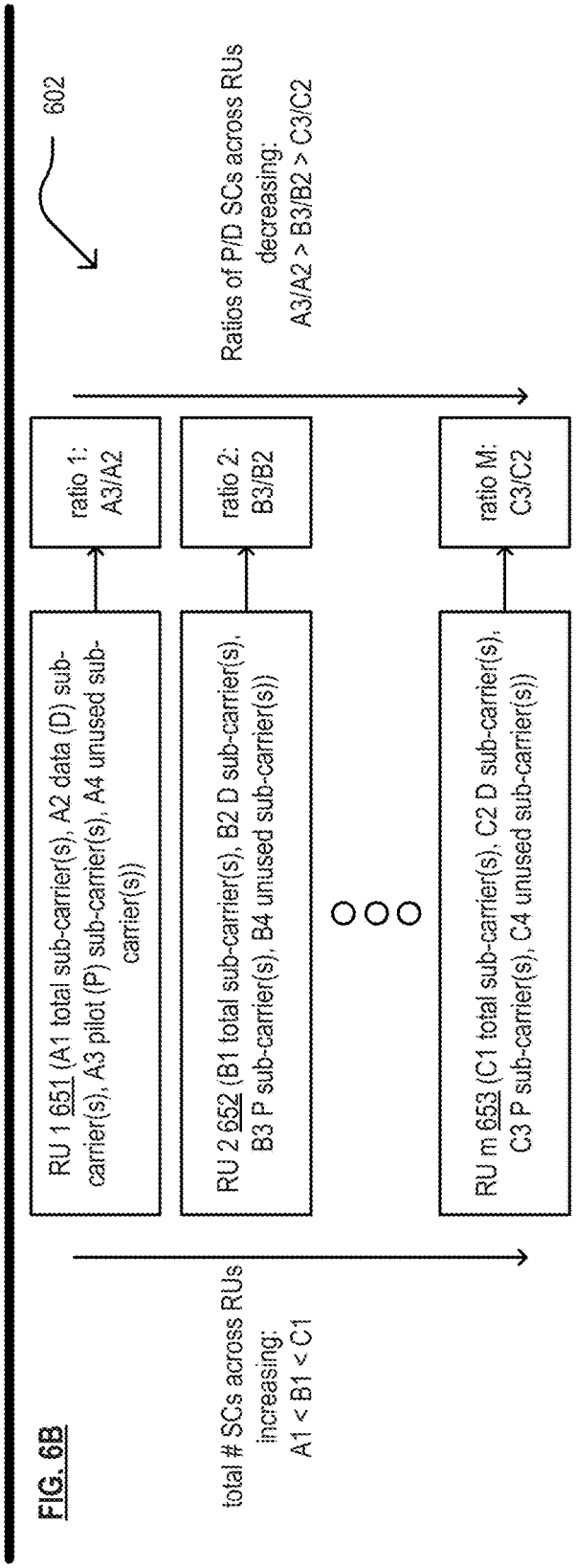
FIG. 6B is a diagram illustrating an example of various types of different resource units (RUs).

FIG. 6B is a diagram illustrating an example 602 of various types of different resource units (RUs). In this example 602, RU 1 651 includes A1 total sub-carrier(s), A2 data (D) sub-carrier(s), A3 pilot (P) sub-carrier(s), and A4 unused sub-carrier(s). RU 2 652 includes B1 total sub-carrier(s), B2 D sub-carrier(s), B3 P sub-carrier(s), and B4 unused sub-carrier(s). RU N 653 includes C1 total sub-carrier(s), C2 D sub-carrier(s), C3 P sub-carrier(s), and C4 unused sub-carrier(s).

Considering the various RUs (e.g., across RU 1 651 to RU N 653), the total number of sub-carriers across the RUs increases from RU 1 651 to RU N 653 (e.g., A1<B1<C1). Also, considering the various RUs (e.g., across RU 1 651 to RU N 653), the ratio of pilot sub-carriers to data sub-carriers across the RUs decreases from RU 1 651 to RU N 653 (e.g., A3/A2>B3/B2>C3/C2).

In some examples, note that different RUs can include a different number of total sub-carriers and a different number of data sub-carriers yet include a same number of pilot sub-carriers.

As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D including allocation of sub-carriers to one or more users).

Some versions of the IEEE 802.11 standard have the following physical layer (PHY) fast Fourier transform (FFT) sizes: 32, 64, 128, 256, 512. In some examples, these PHY FFT sizes are mapped to different bandwidths (BWs) (e.g., which may be achieved using different downclocking ratios or factors applied to a first clock signal to generate different other clock signals such as a second clock signal, a third clock signal, etc.). In some examples, this disclosure refers to FFT sizes instead of BW since FFT size determines a user's specific allocation of sub-carriers, RUs, etc. and the entire system BW using one or more mappings of sub-carriers, RUs, etc.

This disclosure present, among other things, various ways by which the mapping of N users's data into the system BW tones (localized or distributed). Considering one possible example, if the system BW uses 256 FFT, modulation data for 8 different users can each use a 32 FFT, respectively. Alternatively, if the system BW uses 256 FFT, modulation data for 4 different users can each use a 64 FFT, respectively. In another alternative, if the system BW uses 256 FFT, modulation data for 2 different users can each use a 128 FFT, respectively. Also, any number of other combinations is possible with unequal BW allocated to different users such as 32 FFT to 2 users, 64 FFT for one user, and 128 FFT for the last user. In general, any desired number of users and any desired sized FFTs may be used in various examples in accordance with various aspects of the invention.

Localized mapping (e.g., contiguous sub-carrier allocations) to different users such as with reference to FIG. 3D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT users are multiplexed allowing up to 9 users with 242 sub-carriers–(9 users×26 RUs)=8 unused sub-carriers between the users. In yet another example, for 64 FFT users are multiplexed with 242 sub-carriers–(4 users×56 RUs)=18 unused sub-carriers.

The unused sub-carriers can be used to provide better separation between users especially in the UL where users's energy can spill into each other due to imperfect time/frequency/power synchronization creating inter-carrier interference (ICI).

FIG. 7A is a diagram illustrating another example 701 of various types of different RUs. In this example 701, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 701, note that different RUs can include different spacing between the sub-carriers, different sub-carrier densities, implemented within different frequency bands, span different ranges within at least one frequency band, etc.

FIG. 7B is a diagram illustrating another example 702 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 242 total sub-carriers, which is 2× the 242 total sub-carriers of RU 4).

FIG. 7C is a diagram illustrating an example 703 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 64 (e.g., the RU 2 fits within the PHY FFT 64). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128

(e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 3C or FIG. 3D).

FIG. 7D is a diagram illustrating an example 704 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

FIG. 8A is a diagram illustrating an example 801 of a tone/sub-carrier plan. A $1^{st}$ sub-carrier (SC) sub-plan includes multiple resource unit (RUs) that includes 26 sub-carriers and one sized 26 RU that is split across DC (e.g., with one respective RU that includes 13 sub-carriers on each side of DC). A $2^{nd}$ SC sub-plan includes multiple RUs that includes 52 sub-carriers and one sized 26 RU that is split across DC (e.g., with one respective RU that includes 13 sub-carriers on each side of DC); note that each RU 52 includes those sub-carriers directly included above in 2 RU 26 located directly above in the $1^{st}$ SC sub-plan. A $3^{rd}$ SC sub-plan includes multiple RUs that includes 106 sub-carriers and one sized 26 RU that is split across DC (e.g., with one respective RU that includes 13 sub-carriers on each side of DC); note that each RU 106 includes those sub-carriers directly included above in 2 RU 52 located directly as well as 2 null sub-carriers located above in the $2^{nd}$ SC sub-plan. A $4^{th}$ SC sub-plan includes one RU that includes 242 sub-carriers and spans the OFDMA sub-carriers. In some examples, the OFDMA tone/sub-carrier plan of this diagram is based on a communication channel having a bandwidth of 20 MHz. In such a 20 MHz implementation, the unused sub-carrier locations for 26 tones RU (positive and negative indices) are as follows: 2, 3, 69, 122. As for construction of the OFDMA tone/sub-carrier plan in a 20 MHz implementation, RU-106 aligns with two RU-52 with one unused tone at end and one in the middle.

FIG. 8B is a diagram illustrating another example 802 of a tone/sub-carrier plan. This diagram shows an OFDMA tone/sub-carrier plan with 5 SC sub-plans. Details are shown in the diagram. In some examples, the OFDMA tone/sub-carrier plan of this diagram is based on a communication channel having a bandwidth of 40 MHz. In one example of such a 40 MHz implementation, the unused sub-carrier locations for 26 tones RU (positive and negative indices) are as follows: 3, 56, 57, 110, 137, 190, 191, 244.

Note that other examples may include an OFDMA tone/sub-carrier plan with 6 SC sub-plans. In some examples, the OFDMA tone/sub-carrier plan of this diagram is based on a communication channel having a bandwidth of 80 MHz. In one example of such an 80 MHz implementation, the unused sub-carrier locations for 26 tones RU (positive and negative indices) are as follows: 17, 70, 71, 124, 151, 204, 205, 258, 259, 312, 313, 366, 393, 446, 447, 500.

Figure 9A:
FIG. 9A is a diagram illustrating an example of at least a portion of an OFDMA frame.

In seven other examples, a OFDMA tone/sub-carrier plan may be based on a communication channel having a bandwidth of 160 MHz, and this OFDMA tone/sub-carrier plan includes the OFDMA sub-carrier plan of FIG. 9A shown in the left hand side and the right hand side of DC across the communication channel having the bandwidth of 160 MHz.

Certain of the various OFDMA tone/sub-carrier plans include a first OFDMA sub-carrier sub-plan that includes first RUs of a first sub-carrier size and first null sub-carriers that are distributed across the OFDMA sub-carriers as well as a second OFDMA sub-carrier sub-plan that includes second RUs of a second sub-carrier size that are greater than the first sub-carrier size and a second null sub-carriers that are distributed across the OFDMA sub-carriers such that the second null sub-carriers are located in common locations as the first null sub-carriers within the OFDMA sub-carriers.

This disclosure presents, among other things, various resource allocation tables (e.g., RU allocation tables) that may be used to signal resource allocations to different wireless communication devices (e.g., wireless stations (STAs)). In addition, this disclosure presents, among other things, various examples and embodiments of how to use any reserved and/or TBD bits (e.g., such as bits whose value, content, etc. are to be determined (TBD)) in an approved RU allocation table to indicate to a wireless communication device (e.g., STA) if the center 20 MHz RU26 and center 80 MHz RU26 is allocated or not. In some examples, this includes communications including trigger frame, media access control (MAC) delimiter, etc. that may be made in wireless communications including for use within recent, developing, and/or prior/legacy communication protocols, standard, and/or recommended practice, etc. (e.g., IEEE 802.11 versions, standards, amendments, communication protocols, and/or recommended practices, etc. that were developed, issued, etc. before a current IEEE 802.11 version, standard, amendment, communication protocol, and/or recommended practice, etc.).

In a wireless communication system (e.g., a WLAN system) in which a central controller (e.g., an access point (AP), an-AP-operative wireless station (STA), etc.) makes decisions about which device may access the medium, resources (e.g., such as resource units (RUs) as described above, and/or other resources) are allocated after consideration of competing resource requests from participating STAs.

The central controller provides resource allocations for each given phase of data exchange, where each phase of data exchange might provide resource allocations to more than one participating STA corresponding to a single window of time.

The resource allocations for different STAs are orthogonal through various means, e.g., frequency orthogonal, spatially orthogonal, etc.

The central controller indicates the resource allocation for each STA in a broadcasted frame. Such indication may be made using a trigger frame. Various frame formats to perform indication of resource allocation for each STA (e.g., trigger frames) are presented herein.

In one example, a STA will prepare data for transmission to the central controller after parsing the resource allocation information conveyed in the trigger frame and discovering a resource allocation allocated to itself.

In some examples, a RU allocation signal may include a certain number of bits (e.g., 8 bits) to signal the RU allocation for the various respective communication channels (e.g., each respective 20 MHz channel within the available channel bandwidth).

In some examples, one or more first RU sizes are specified for single user (SU) applications and one or more second RU sizes are specified for multiple user (MU) applications (e.g., such as with respect to FIG. 4C or FIG. 4D).

In one example, RU26 and RU52 are specified for SU (single user).

In another example, RU106, RU242, RU484 RU996 and 2×RU996 are specified SU or MU (multiple users). In one specific example, RU106 is used for up to 4 users. In another specific example, RU242, RU484, RU996 and 2×RU996 are used for up to 8 users. In certain examples, the "Reserved" portions (e.g., the unused table locations) are kept in contiguous segment(s) (e.g., groups of contiguous or adjacently located sub-carriers/tones).

In many of the various diagrams shown below, various sub-carrier/tone plans, including a number of users that is supported by that specific sub-carrier/tone plan, are specified on the left hand side (LHS) of the diagram.

Note also that the particular bits used to signal which specific sub-carrier/tone plan is being signaled is shown on the right hand side (RHS) of the diagram. Note that some of the sub-carrier/tone plans are for single user (SU) applications (e.g., # Users=1) while other of the sub-carrier/tone plans are for multiple user (MU) applications (e.g., # Users=any positive integer greater than 1, such as 4, 16, 8, 32, 128). Note also that these various diagrams include RUs of different sizes (e.g., RU26 including 26 sub-carriers/tones, RU52 including 52 sub-carriers/tones, RU106 including 106 sub-carriers/tones, RU242 including 242 sub-carriers/tones, RU484 including 484 sub-carriers/tones, RU996 including 996 sub-carriers/tones, and/or RU2×996 including 2×996 (or 1,992) sub-carriers/tones.

In some examples, a particular field of an OFDM/A packet is used to signal the RU allocation. In some specific examples, contents of a signal field (SIG) (e.g., such as SIGA and/or SIGB). For examples, contents of a field of an OFDM/A packet (e.g., SIGB can be used to signal a particular RU allocation, R2).

FIG. 9A is a diagram illustrating an example 901 of at least a portion of an OFDMA frame. In this diagram, X bit indices (e.g., a multi-bit indices including X bits, wherein X is a positive integer greater than or equal to 2) that specifies a particular sub-carrier/tone plan (e.g., such as any given row as shown in the various levels of the sub-carrier/tone plans of FIG. 8A, FIG. 8B, and/or their equivalents) and a particular structure of RU(s) including the respective sizes and/or locations of the RU(s) within the corresponding sub-carrier/tone plan. Then following the X bit indices are wireless station (STA) identifiers (IDs) that correspond to the respective RUs. For example, if the corresponding sub-carrier/tone plan includes n RUs, then it will be followed by n STA IDs.

Referring to the diagram, X bit index value 0 . . . 0 . . . 00 specifies n RU1 sized RUs (e.g., where RU1 may be a RU13, RU26, or other sized RU) and is followed by n STA IDs, where the $1^{st}$ STA ID corresponds to the $1^{st}$ RU1, the $2^{nd}$ STA ID corresponds to the $2^{nd}$ RU1, etc. In another example, X bit index value 0 . . . 0 . . . 01 specifies a particular number of RU2 sized RUs (e.g., where RU2 may be a RU26, RU52 or other sized RU) and is followed by a corresponding number of STA IDs, where the $1^{st}$ STA ID corresponds to the $1^{st}$ RU2, the $2^{nd}$ STA ID corresponds to the $2^{nd}$ RU2, etc. In another example, X bit index value 0 . . . 0 . . . 10 specifies one RUy sized RU (e.g., where RUy may be a RU106, RU242, RU484 or other sized RU) and is followed by a corresponding one STA ID that corresponds to that one RUy sized RU.

Then, X bit index value 1 . . . x . . . xx includes certain bits whose definition is to be determined (TBD) and is used to specify non-allocation (and/or allocation) or RUs. For example, a first value of the X bit index value 1 . . . x . . . xx specifies that n RU1 sized RUs (e.g., where RU1 may be a RU13, RU26, or other sized RU) where the $2^{nd}$ RU is not allocated. As such, there is no corresponding STA ID that gets included for the non-allocated RU. For each RU that does not get allocated, there is no corresponding STA ID. For example, considering an example where each STA ID includes 22 bits, then a savings of 22×A, where A is the number of non-allocated RUs indicated in the particular X bit index value 1 . . . x . . . xx, is achieved thereby reducing overhead, throughput, and increasing availability and efficiency usage of the communication medium. Instead of sending a null STA ID (e.g., a STA ID that is not (currently) used or assigned by any STA within the system) in which bits are still sent via the communication medium, when an RU is not allocated, then no bits need be sent via the communication medium.

In another example, a second value of the X bit index value 1 . . . x . . . xx specifies that a particular number of RU2 sized RUs (e.g., where RU2 may be a RU26, RU52 or other sized RU) such that the first RU2 sized RU is not allocated and includes a corresponding number of STA IDs for those RUs that are allocated. In even another example, a third value of the X bit index value 1 . . . x . . . xx specifies that one RUy sized RU (e.g., where RUy may be a RU106, RU242, RU484 or other sized RU) that is not allocated and is not followed by any STA ID (e.g., because that RU is not allocated).

Figure 9B:
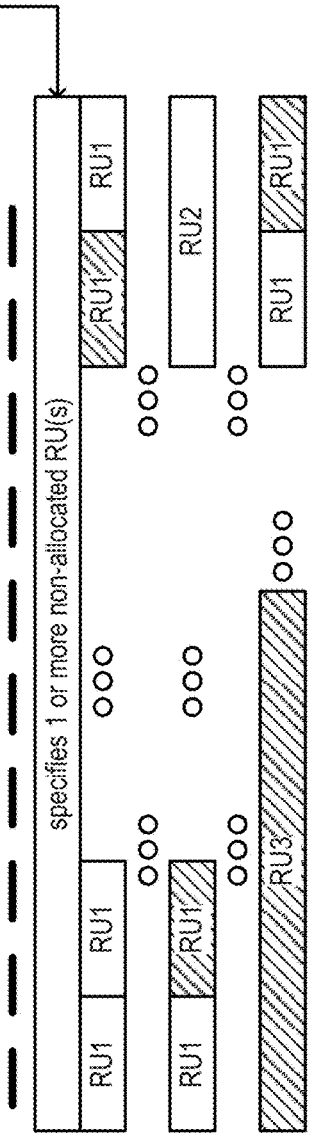
FIG. 9B is a diagram illustrating another example of at least a portion of an OFDMA frame.

FIG. 9B is a diagram illustrating another example 902 of at least a portion of an OFDMA frame. This diagram has some similarities to FIG. 9A. Referring to the diagram, X bit index value 0 . . . 000 specifies m RU1 sized RUs (e.g., where RU1 may be a RU13, RU26, or other sized RU) and is followed by m STA IDs, where the $1^{st}$ STA ID corresponds to the $1^{st}$ RU1, the $2^{nd}$ STA ID corresponds to the $2^{nd}$ RU1, etc. In another example, X bit index value 0 . . . 001 specifies a certain number of RU1 sized RUs followed by one or more RU2 sized RUs and is followed by a corresponding number of STA IDs, where the $1^{st}$ STA ID corresponds to the $1^{st}$ RU1, the $2^{nd}$ STA ID corresponds to the $2^{nd}$ RU1, and so on until the last STA ID corresponds to the last RU2.

In another example, X bit index value 0 . . . 010 specifies a certain number of RU1 sized RUs followed by one or more RU2 sized RUs and is followed by a RU1 sized RU and is followed by a corresponding number of STA IDs, where the $1^{st}$ STA ID corresponds to the $1^{st}$ RU1, the $2^{nd}$ STA ID corresponds to the $2^{nd}$ RU1, and so on until the $2^{nd}$ to last STA ID corresponds to the RU2 sized RU and the last STA ID corresponds to the RU1 sized RU.

In another example, X bit index value 0 . . . 011 specifies a RU3 sized RUs followed by one or more RU1 sized RUs and is followed by a corresponding number of STA IDs, where the $1^{st}$ STA ID corresponds to the RU3 sized RU, and so on until the $2^{nd}$ to last STA ID corresponds to the $2^{nd}$ to last RU1 sized RU and the last STA ID corresponds to the last RU1 sized RU.

In another example, X bit index value 0 . . . 100 specifies a certain number of RU1 sized RUs followed by a RU3 sized RUs followed by a corresponding number of STA IDs, where the 1$^{st}$ STA ID corresponds to the RU1 sized RU, and so on until the last STA ID corresponds to the last RU4 sized RU.

Then, X bit index value 1 . . . xxx includes certain bits whose definition is to be determined (TBD) and is used to specify non-allocation (and/or allocation) or RUs. For example, a first value of the X bit index value 1 . . . xxx specifies m RU1 sized RUs (e.g., where RU1 may be a RU13, RU26, or other sized RU) and is followed by fewer than m STA IDs, where the 1$^{st}$ STA ID corresponds to the 1$^{st}$ RU1, the 2$^{nd}$ STA ID corresponds to the 2$^{nd}$ RU1, and so on but no STA ID is sent for the 2$^{nd}$ to last RU1 followed by a STA ID for the last RU1.

In another example, a second value of the X bit index value 1 . . . xxx specifies a certain number of RU1 sized RUs followed by one or more RU2 sized RUs is followed by a first STA ID for the first RU1, yet with no STA ID for the second RU1 that is not allocated, and so on followed by a last STA ID for the last RU2.

In another example, a third value of the X bit index value 1 . . . xxx specifies a certain number of RU3 sized RUs followed by one or more RU1 sized RUs yet is not followed by any STA ID for the first RU3 sized RU that is not allocated, and so on and is followed by a STA ID for the second to last RU1 that is allocated yet is not followed by any STA ID for the last RU1 sized RU that is not allocated.

When a given RU is not allocated for use, then no corresponding STA ID is sent.

Considering another example, an RU allocation table (e.g., RU allocation signaling) may include multi-bit indices that specify allocation and/or non-allocation of RUs. When an RU is allocated, a corresponding STA ID may be sent. When an RU is not allocated, then no corresponding STA ID needs to be sent. In one example, an RU allocation table can include a certain number (e.g., 80) to be determined (TBD) values (e.g., 00 1xxxx (16), 011 xxxxx (32), and 111 xxxxx (32). This disclosure presents, among other things, using some of these TBD to indicate when the center 20 MHz RU26 and center 80 MHz RU26 is not allocated in a RU allocation. However, in some instances, there may not be enough TBD available to handle every possibility. As such, various examples and embodiments are presented herein to use the TBD wisely, and even some options may involve keeping some TBD for future proofing.

In this disclosure, note that various examples and embodiments may use a TDB range (e.g., "0001xxxx", "011xxxxx", "111xxxxx"), but other examples may be used or alternative ranges may be used.

FIG. 10A is a diagram illustrating another example 1001 of at least a portion of an OFDMA frame. In this example, an OFDMA frame includes a common block that carries resource allocation (RA) signaling that specifies the sub-carrier/tone plan and level therein and is followed by signaling that specifies a certain number of user blocks and specifically, parsing of the RA signaling indicates the specific structure of the particular user blocks for this particular 20 MHz portion of the communication channel (e.g., 1 20 MHz channel or a sub-channel of a larger communication channel). Note that while 6 user blocks (e.g., 6 WDEVs, 6 STA IDs) are shown in this example, other examples may include fewer or more user blocks. Note that while a 20 MHz channel or sub-channel is shown in this example, other examples may include smaller or larger channels or sub-channels.

FIG. 10B is a diagram illustrating another example 1002 of at least a portion of an OFDMA frame. This diagram includes 8 bits of RU allocation that indicate the number and size of RUs. For example: a multi-bit index of "0000 0000" indicate nine 26 tones RUs, thus nine User Blocks will follow. This may be implemented using a common block such as may be included in a signal field (SIG) (e.g., in HE-SIG-B such as described in one or more of the previous diagrams described above). Note that the user blocks contents may be based on a particular communication protocol, standard, and/or recommended practice. For example, a User Block may include 21 bits and two user blocks may have one Cyclic Redundancy Check (CRC) of a certain number of bits (e.g., 4b) at the end.

FIG. 10C is a diagram illustrating another example 1003 of at least a portion of an OFDMA frame. This diagram can include individual coding for every K blocks (e.g., based on a function being a ceil(N/K)+1 binary convolutional code (BCC)/tail-biting BCC), where K is TBD (e.g., and may be bandwidth (BW) dependent. Note that both BCC and/or TBCC may be used. Note that various examples of grouping and BCC may be used to balance performance and overhead. CRC and tail bits may be used every K user blocks to reduce overhead, and this may be used to mitigate any performance degradation issues that may arise with respect to TBCC performance loss and/or excessively long BCC. Note that signaling the non-allocation of some RUs (e.g., center RU26) in the RU allocation table as opposed to using null STAID (e.g., a STA ID that is not (currently) used or assigned by any STA within the system) saves a significant number of bits (e.g., 21 bits when Nuser is odd or 25 bits when Nuser is even).

FIG. 10D is a diagram illustrating an embodiment of a method 1004 for execution by one or more wireless communication devices. The method 1004 begins by generating an orthogonal frequency division multiple access (OFDMA) frame that includes a preamble that specifies allocation of at least one resource unit (RU) for a communication channel or non-allocation of the at least one RU for the communication channel (block 1010).

In some examples, when the preamble specifies the allocation of the at least one RU for the communication channel, a multi-bit index of the preamble specifies at least one of a size or a location of the at least one RU allocated for the communication channel (block 1012). In other examples, when the preamble specifies the non-allocation of the at least one RU for the communication channel, the multi-bit index of the preamble specifies the at least one of the size or the location of the at least one RU that is not allocated for the communication channel (block 1014). In even other examples, when the preamble specifies both allocation of a first at least one RU and also the non-allocation of a second at least one RU for the communication channel, the multi-bit index of the preamble specifies the at least one of the size or the location of the first at least one RU that is allocated and/or the second at least one RU that is not allocated for the communication channel (block 1016).

The method 1004 then operates by transmitting (e.g., via a communication interface of the wireless communication device and via the communication channel) the OFDMA frame to at least one other wireless communication device to be processed by the at least one other wireless communication device to determine the allocation of the at least one RU for the communication channel or the non-allocation of the at least one RU for the communication channel (block 1020).

In some examples, the method 1004 continues by supporting communications (e.g., with the at least one other wireless communication device) based on any allocated RUs(s) (block 1040).

FIG. 10E is a diagram illustrating another embodiment of a method 1005 for execution by one or more wireless communication devices. The method 1005 begins by transmitting (e.g., via a communication interface of the wireless communication device and via a communication channel) an OFDMA frame from another wireless communication device (block 1011). The method 1005 continues by processing a preamble of the OFDMA frame that specifies allocation and/or non-allocation of RU(s) for a communication channel based on at least one sub-carrier/tone plan (block 1021). The method 1005 then operates by supporting communications (e.g., with the other wireless communication device) based on any allocated RUs(s) (block 1031).

It is noted that the various operations and functions described within various methods herein may be performed within a wireless communication device (e.g., such as by the processing circuitry 330, communication interface 320, and memory 340 or processing circuitry 330a and/or processing circuitry 330b such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one or more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface; and
   processing circuitry that is coupled to the communication interface, wherein at least one of the communication interface or the processing circuitry configured to:
   receive, from another wireless communication device and via a communication channel, an orthogonal frequency division multiple access (OFDMA) frame that includes a preamble that specifies allocation of a first at least one resource unit (RU) for the communication channel and non-allocation of a second at least one RU for the communication channel;
   process the OFDMA frame to determine whether a multi-bit index of the preamble is set to a first value or to a second value;
   respectively, either:
      based on a first determination that the multi-bit index of the preamble is set to the first value, determine a first size and a first location of the first at least one RU that is allocated for the communication channel, determine a second size and a second location of the second at least one RU that is not allocated for the communication channel, and determine that the OFDMA frame does not include a corresponding station (STA) identifier (ID) for the second at least one RU, or
      based on a second determination that the multi-bit index of the preamble is set to the second value, determine a third size and a third location of the first at least one RU that is allocated for the communication channel, determine a fourth size and a fourth location of the second at least one RU that is not allocated for the communication channel, and determine that the OFDMA frame does not include the corresponding STA ID for the second at least one RU; and
   schedule communications in accordance with the determined sizes and locations.

2. The wireless communication device of claim 1, wherein the OFDMA frame includes at least one wireless station (STA) identifier (ID) for which the first at least one RU is allocated; and wherein the at least one of the communication interface or the processing circuitry is further configured to:
   process the OFDMA frame to determine the at least one STA ID for which the first at least one RU is allocated.

3. The wireless communication device of claim 1, wherein the multi-bit index of the preamble specifies the second size and the second location of the second at least one RU that is not allocated for the communication channel and also specifies at least one of another size or another location of at least one other RU allocated for the communication channel, and wherein the OFDMA frame also includes at least one wireless station (STA) identifier (ID) for which the at least one other RU is allocated; and wherein the at least one of the communication interface or the processing circuitry is further configured to perform at least one of:
   process the multi-bit index of the preamble to determine the second size and the second location of the second at least one RU that is not allocated for the communication channel and the at least one of another size or another location of at least one other RU allocated for the communication channel; or
   process the OFDMA frame to determine the at least one STA ID for which the first at least one RU is allocated.

4. The wireless communication device of claim 1, wherein the preamble of the OFDMA frame specifies allocation of at least two RUs for the communication channel and also includes a first wireless station (STA) identifier (ID) for which a first RU of the at least two RUs is allocated followed by a second STA ID for which a second RU of the at least two RUs is allocated; and wherein the at least one of the communication interface or the processing circuitry is further configured to:

process the preamble of the OFDMA frame to determine the allocation of the at least two RUs for the communication channel and the first STA ID for which the first RU of the at least two RUs is allocated followed by the second STA ID for which the second RU of the at least two RUs is allocated.

5. The wireless communication device of claim 1, wherein the at least one of the communication interface or the processing circuitry is further configured to:

receive another OFDMA frame that includes another preamble that specifies non-allocation of at least one other RU for the communication channel, wherein another multi-bit index of the another preamble specifies at least one of another size or another location of the at least one other RU that is not allocated for the communication channel; and process the another OFDMA frame to determine the non-allocation of the at least one other RU for the communication channel.

6. The wireless communication device of claim 1 further comprising:

the communication interface configured to support communications within at least one of a satellite communication system, a wireless communication system, a wired communication system, a fiber-optic communication system, or a mobile communication system.

7. The wireless communication device of claim 1 further comprising:

a wireless station (STA), wherein the another wireless communication device includes an access point (AP).

8. The wireless communication device of claim 1 further comprising:

a wireless station (STA), wherein the another wireless communication device includes another wireless station (STA).

9. A wireless communication device comprising:

a communication interface; and processing circuitry that is coupled to the communication interface, wherein at least one of the communication interface or the processing circuitry configured to:

receive, from another wireless communication device and via a communication channel, an orthogonal frequency division multiple access (OFDMA) frame that includes a preamble that specifies allocation of a first at least one resource unit (RU) for the communication channel and non-allocation of a second at least one RU for the communication channel, wherein the OFDMA frame includes at least one wireless station (STA) identifier (ID) for which the first at least one RU is allocated;

process the OFDMA frame to determine whether a multi-bit index of the preamble is set to a first value or to a second value;

respectively, either:

based on a first determination that the multi-bit index of the preamble is set to the first value, determine a first size and a first location of the first at least one RU that is allocated for the communication channel, determine a second size and a second location of the second at least one RU that is not allocated for the communication channel, and determine that the OFDMA frame does not include a corresponding station (STA) identifier (ID) for the second at least one RU, or based on a second determination that the multi-bit index of the preamble is set to the second value, determine a third size and a third location of the first at least one RU that is allocated for the communication channel, determine a fourth size and a fourth location of the second at least one RU that is not allocated for the communication channel, and determine that the OFDMA frame does not include the corresponding STA ID for the second at least one RU;

receive another OFDMA frame that includes another preamble that specifies non-allocation of at least one other RU for the communication channel, wherein another multi-bit index of the another preamble specifies at least one of another size or another location of the at least one other RU that is not allocated for the communication channel;

process the another OFDMA frame to determine the non-allocation of the at least one other RU for the communication channel; and schedule communications in accordance with the determined sizes and locations.

10. The wireless communication device of claim 9, wherein the multi-bit index of the preamble specifies the second size and the second location of the second at least one RU that is not allocated for the communication channel; and wherein the at least one of the communication interface or the processing circuitry is further configured to:

process the multi-bit index of the preamble of the OFDMA frame to determine the second size and the second location of the second at least one RU that is not allocated for the communication channel.

11. The wireless communication device of claim 9, wherein the preamble of the OFDMA frame specifies allocation of at least two RUs for the communication channel and also includes a first wireless station (STA) identifier (ID) for which a first RU of the at least two RUs is allocated followed by a second STA ID for which a second RU of the at least two RUs is allocated; and wherein the at least one of the communication interface or the processing circuitry is further configured to:

process the preamble of the OFDMA frame to determine the allocation of the at least two RUs for the communication channel and the first STA ID for which the first RU of the at least two RUs is allocated followed by the second STA ID for which the second RU of the at least two RUs is allocated.

12. The wireless communication device of claim 9 further comprising:

the communication interface configured to support communications within at least one of a satellite communication system, a wireless communication system, a wired communication system, a fiber-optic communication system, or a mobile communication system.

13. The wireless communication device of claim 9 further comprising:

a wireless station (STA), wherein the another wireless communication device includes an access point (AP).

14. A method for execution by a wireless communication device, the method comprising:

receiving, from another wireless communication device, via a communication channel, and via a communication interface of the wireless communication device, an orthogonal frequency division multiple access (OFDMA) frame that includes a preamble that specifies allocation of a first at least one resource unit (RU) for the communication channel and non-allocation of a second at least one RU for the communication channel;

processing the OFDMA frame to determine whether a multi-bit index of the preamble is set to a first value or to a second value;

respectively, either:

based on a first determination that the multi-bit index of the preamble is set to the first value, determining a first size and a first location of the first at least one RU that is allocated for the communication channel and a second size, determining a second location of the second at least one RU that is not allocated for the communication channel, and determining that the OFDMA frame does not include a corresponding station (STA) identifier (ID) for the second at least one RU, or based on a second determination that the multi-bit index of the preamble is set to the second value, determining a third size and a third location of the first at least one RU that is allocated for the communication channel, determining a fourth size and a fourth location of the second at least one RU that is not allocated for the communication channel, and determining that the OFDMA frame does not include the STA ID for the second at least one RU; and scheduling communications in accordance with the determined sizes and locations.

15. The method of claim 14, wherein the OFDMA frame includes at least one wireless station (STA) identifier (ID) for which the first at least one RU is allocated; and further comprising:

processing the OFDMA frame to determine the at least one STA ID for which the first at least one RU is allocated.

16. The method of claim 14, wherein the multi-bit index of the preamble specifies the second size and the second location of the second at least one RU that is not allocated for the communication channel and also specifies at least one of another size or another location of at least one other RU allocated for the communication channel, and wherein the OFDMA frame also includes at least one wireless station (STA) identifier (ID) for which the at least one other RU is allocated; and further comprising:

processing the multi-bit index of the preamble to determine the second size and the second location of the second at least one RU that is not allocated for the communication channel and the at least one of another size or another location of at least one other RU allocated for the communication channel; or processing the OFDMA frame to determine the at least one STA ID for which the first at least one RU is allocated.

17. The method of claim 14, wherein the preamble of the OFDMA frame specifies allocation of at least two RUs for the communication channel and also includes a first wireless station (STA) identifier (ID) for which a first RU of the at least two RUs is allocated followed by a second STA ID for which a second RU of the at least two RUs is allocated; and further comprising:

processing the preamble of the OFDMA frame to determine the allocation of the at least two RUs for the communication channel and the first STA ID for which the first RU of the at least two RUs is allocated followed by the second STA ID for which the second RU of the at least two RUs is allocated.

18. The method of claim 14 further comprising:

receiving another OFDMA frame that includes another preamble that specifies non-allocation of at least one other RU for the communication channel, wherein another multi-bit index of the another preamble specifies at least one of another size or another location of the at least one other RU that is not allocated for the communication channel; and processing the another OFDMA frame to determine the non-allocation of the at least one other RU for the communication channel.

19. The method of claim 14 further comprising:

operating the communication interface to support communications within at least one of a satellite communication system, a wireless communication system, a wired communication system, a fiber-optic communication system, or a mobile communication system.

20. The method of claim 14, wherein the wireless communication device includes a wireless station (STA), and the another wireless communication device includes an access point (AP).

* * * * *